United States Patent [19]
Chen et al.

[11] Patent Number: 6,153,663
[45] Date of Patent: Nov. 28, 2000

[54] UV CURABLE HIGH INDEX VINYL ESTERS

[75] Inventors: Fang Chen, Hallett Cove; Huan Kiak Toh, Fullarton, both of Australia

[73] Assignee: Sola International Holding, Ltd., Lonsdale, Australia

[21] Appl. No.: 09/194,503

[22] PCT Filed: May 22, 1997

[86] PCT No.: PCT/AU97/00310

§ 371 Date: Mar. 31, 1999

§ 102(e) Date: Mar. 31, 1999

[87] PCT Pub. No.: WO97/44372

PCT Pub. Date: Nov. 27, 1997

[30] Foreign Application Priority Data

May 23, 1996 [AU] Australia .............................. PO 00037
Sep. 30, 1996 [AU] Australia .............................. PO 02635

[51] Int. Cl.[7] .......................... C08F 2/46; C08F 216/12; C08F 116/12; C08G 63/52

[52] U.S. Cl. ....................... 522/181; 522/182; 522/180; 526/308; 526/286; 526/282; 526/292.3; 526/328; 526/328.5; 526/323.1; 526/323.2; 526/306; 528/306; 528/307; 528/308; 428/413; 428/419; 428/422.8; 428/500

[58] Field of Search ..................... 522/180, 181, 522/183; 526/323.1, 323.2, 308, 282, 328.5, 328, 292.3, 286; 528/306, 307, 308; 428/413, 419, 422.8, 500

[56] References Cited

U.S. PATENT DOCUMENTS

| | | | |
|---|---|---|---|
| 4,663,412 | 5/1987 | Guillet et al. | 526/284 |
| 4,912,185 | 3/1990 | Toh | 526/301 |
| 4,931,521 | 6/1990 | Matsuda et al. | 526/285 |
| 4,973,640 | 11/1990 | Matsuda et al. | 526/323.1 |
| 5,034,433 | 7/1991 | Cohen et al. | 523/400 |
| 5,183,917 | 2/1993 | Maruyama et al. | 558/251 |
| 5,191,055 | 3/1993 | Kanemura et al. | 528/77 |
| 5,196,296 | 3/1993 | Watanabe et al. | 430/288.1 |
| 5,270,439 | 12/1993 | Maruyama et al. | 528/373 |
| 5,308,886 | 5/1994 | Masuhara et al. | 522/81 |
| 5,373,033 | 12/1994 | Toh et al. | 522/96 |
| 5,395,900 | 3/1995 | Liaw et al. | 525/531 |
| 5,484,863 | 1/1996 | Molock et al. | 526/301 |
| 5,502,139 | 3/1996 | Toh et al. | 526/284 |
| 5,519,069 | 5/1996 | Burke et al. | 523/106 |
| 5,739,243 | 4/1998 | Herold et al. | 526/325 |
| 5,880,171 | 3/1999 | Lim et al. | 523/106 |
| 5,881,503 | 9/1998 | Herold et al. | 526/323.2 |
| 5,942,303 | 8/1999 | Tanaka et al. | 428/64.4 |
| 5,977,276 | 11/1999 | Toh et al. | 526/308 |

FOREIGN PATENT DOCUMENTS

| | | |
|---|---|---|
| 50581 | 5/1994 | Australia . |
| 50582 | 5/1994 | Australia . |
| 54894 | 10/1996 | Australia . |
| 56807 | 12/1996 | Australia . |
| 0453 149 | 10/1991 | European Pat. Off. . |
| 7-412520 | 10/1995 | Japan . |

OTHER PUBLICATIONS

Derwent Abstract Accession No. 93–055221/07, JP0500501 1–A, "resin compsn. for moulding glass lens having good transparency comprising styrene deriv., ethylene glycol dimethacrylate, diacrylate cpd., epoxy–modified di(meth)acrylate and peroxy ester" Jan. 14, 1993.

*Primary Examiner*—James J. Seidleck
*Assistant Examiner*—Sanza McClendon
*Attorney, Agent, or Firm*—Burns, Doane, Swecker & Mathis, L.L.P.

[57] ABSTRACT

A cross-linkage polymeric casting composition including an effective amount of a divinyl ester monomer of a bicyclic or polycyclic compound, and optionally, a minor amount of a di- or polythio compound. The specification and claims include allylic ethers withing the definition of divinyl ester, for example bisphenol fluorene diglycidyl allylic ether and bisphenol S diallyl ether.

19 Claims, 6 Drawing Sheets

UV CURABLE HIGH INDEX VINYL ESTERS

The present invention relates to the manufacture of plastic optical articles such as video discs and ophthalmic lenses.

The most widely used plastic ophthalmic lens material is polymerised diethylene glycol bis (allyl carbonate). This polymer has provided a satisfactory material for the manufacture of ophthalmic lenses because of a combination of features, including excellent transmission, resistance to discolouration, high strength and high impact resistance. The material has a reasonable abrasion resistance and can be coated to improve that resistance.

Lenses formed from polymers including divinyl benzene are generally brittle and have a high yellowness index.

In Australian Patent Application 81216/87, the entire disclosure of which is incorporated herein by reference, applicant describes a cross-linkable casting composition including at last polyoxyalkylene glycol diacrylate or dimethyacrylate and at least one poly functional unsaturated cross-linking agent. Whilst the lenses produced from the prior art compositions provide advances in the art, difficulties may be encountered in certain applications. For example, difficulties may be encountered in some patients in fitting lenses made from such compositions. Eye discomfort, including eye fatigue problems, may be encountered. Moreover, such lenses have been found to be cosmetically unattractive.

Further, in Australian Patent Application 75160/91, the entire disclosure of which is incorporated herein by reference, applicant describes a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

Japanese Patent Application 63-309509 to Showa Denko KK discloses the formation of a prepolymer of divinyl benzene and a polythiol compound which may be used in the formation of optical materials with high refractive indexes.

Japanese Patent Application 63-19498 to Mitsubishi Gas discloses a high refractive index composition of divinyl benzene and a thiol compound. However optical lenses produced thereby exhibit unacceptable strain characteristics and core times.

However, there remains a need in the prior art for optical articles of very high refractive indexes, very low densities and excellent colour, that still retain excellent mechanical properties.

Accordingly, it is an object of the present invention to overcome, or at least alleviate, one or more of the difficulties related to the prior art.

Accordingly, the present invention provides a cross-linkable polymeric casting composition including an effective amount of a divinyl ester monomer of a bicyclic or polycyclic compound; and optionally a minor amount of a di- or polythio compound.

The inclusion of the bicyclic monomer may provide an increase in rigidity, (and thus hardness) and glass transition temperature (Tg). The cross-linkable polymeric casting composition is U.V. curable. This may provide a significant decrease in cure time, e.g. from approximately 6 hours to approximately 1 hour.

The optical article formed from the casting composition of the present invention may exhibit a refractive index in the high to very high refractive index range.

The divinyl ester cyclic monomer may be a divinyl ester of an alkoxylated bisphenol C or bisphenol S, or mixtures thereof.

The bicyclic or polycyclic monomer may be selected from compounds having the formula

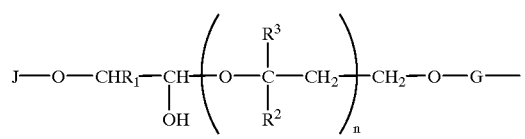

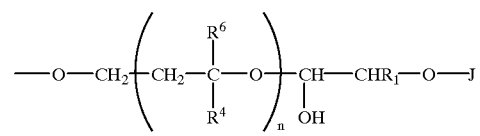

wherein

G is selected from the group consisting of

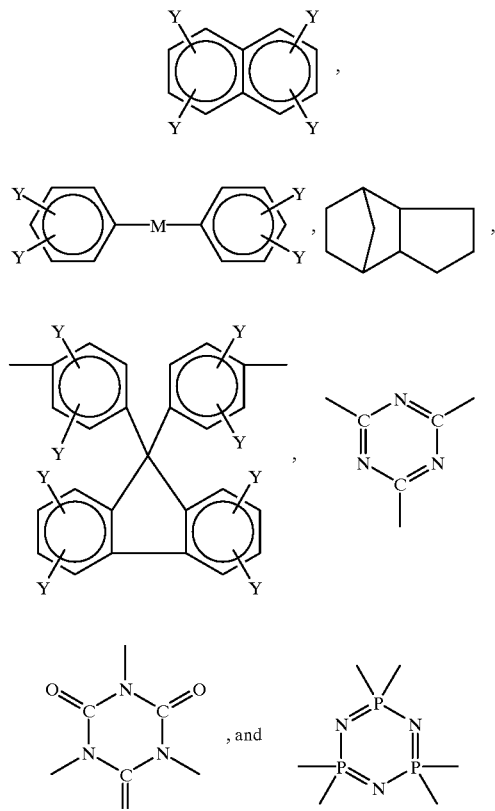

, and wherein M is selected from the group consisting of a bond,

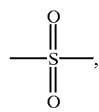

—S— methylene and —CH$_2$—S—CH$_2$—

R$_1$, R$_2$, R$_3$ and R$_4$ are independently selected from the group consisting of hydrogen and alkyl of 1 to 6 carbon atoms, n is an integer having a value of 0 to 10, Y is hydrogen or a halogen, preferably fluorine, chlorine or bromine, and J is a unsaturated terminal group particularly an alkyl group or group of formula

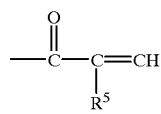

wherein R$^5$ is hydrogen or C$_1$ to C$_6$ alkyl. Most preferably R$^5$ is hydrogen or methyl.

Preferably M is a bond,

or methylen when M is a bond G has the formula

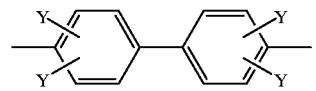

Preferably G is a bisphenol S, naphthalene or bisphenol fluorene derivative.

Particularly preferred bicyclic or polycyclic monomers may be selected from one or more of the following:

An bisphenol S divinyl ester of the formula

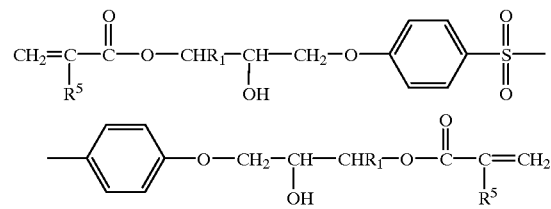

a naphthalene-based ethoxylated divinyl ester of the formula (II)

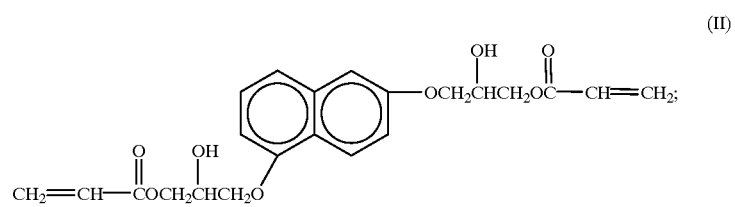

a bisphenol fluorene diglycidyl allylic monomer of the formula

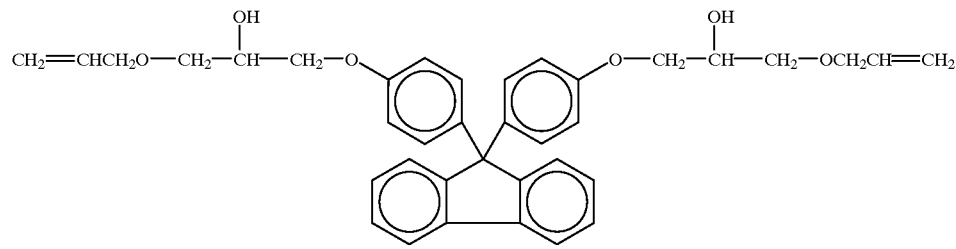

and a bisphenol S diallyl ether of the formula (VI)

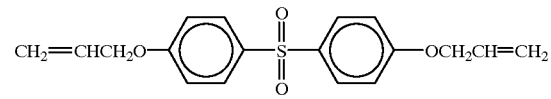

The divinyl ester cyclic monomers may be formed by reacting a di- or poly-epoxide monomer of a bisphenol compound with an acrylic or methacrylic acid. Suitable di-epoxide monomers are as follows:

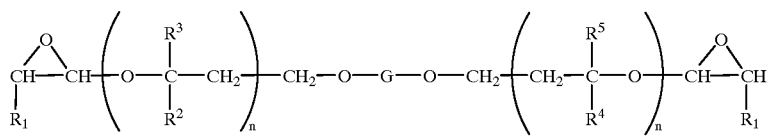

wherein G is selected from one or more of the following

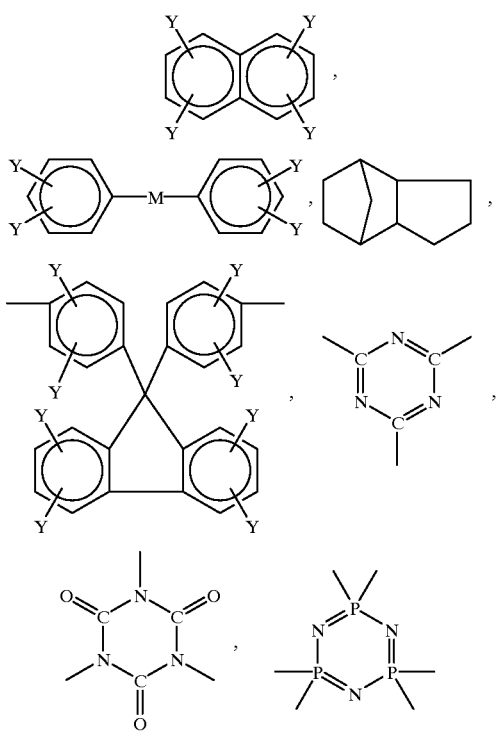

wherein
M is selected from the group consisting of a bond,

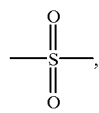

—S— methylene and —$CH_2$—S—$CH_2$—,
$R_1$, $R_2$, $R_3$, $R_4$ and $R_5$ are independently selected from the group consisting of hydrogen and alkyl of 1 to 6 carbon atoms,
n is an integer having a value of 0 to 8,
Y is hydrogen or a halogen, preferably fluorine, chlorine or bromine, and
A di- or polyepoxide of a bisphenol monomer is preferred.
The di- or polyepoxide bisphenol monomer may be a di- or polyepoxide of bisphenol A or bisphenol S, or mixtures thereof.
The cyclic monomer may be present in amounts of from approximately 2.5 to 100% by weight, preferably approximately 5 to 80% by weight, more preferably approximately 10 to 70% by weight, based on the total weight of the casting composition.

The di- or polythiol compound, when present, may be of any suitable type. A di-, tri- or tetra polythiol compound may be used. A tri- or tetra-polythiol is preferred. The thiol may be selected from one or more of the following:

(a) Pentaerythritol Tetrakis (3-mercapto-propionate) [PTMP]
$$C(CH2OCCH_2CH_2SH)_4$$
$$\overset{\|}{O}$$

(b) Trimethylolpropane Tris (3-mercaptopropionate) [TTMP]
$$CH_3CH_2C(CH_2OCCH_2CH_2SH)_3$$
$$\overset{\|}{O}$$

(c) 4-mercaptomethyl-3,6-dithia-1,8-octanedithiol [MDO]
$$CH_2SH$$
$$|$$
$$CHSCH_2CH_2SH$$
$$|$$
$$CH_2SCH_2CH_2S$$

(d) Pentaerythritol Tetrakis (3-mercaptoacetate) [PTMA]
$$C(CH2OCCH_2SH)_4$$
$$\overset{\|}{O}$$

(e) Trimethylolpropane Tris (3-mercaptoacetate) [TTMA]
$$CH_3CH_2C(CH_2OCCH_2SH)_2$$
$$\overset{\|}{O}$$

(f) 4-t-butyl-1,2-benzenedithiol

(g) 2-mercaptoethylsulfide
$$HSCH_2CH_2SCH_2CH_2SH$$

(h) 4,4-thiodibenzenethiol

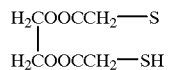

(i) benzenedithiol (j) Glycol Dimercaptoacetate
$$H_2COOCCH_2—S$$
$$|$$
$$H_2COOCCH_2—SH$$

-continued (k) Glycol Dimercaptopropionate Ethylene bis(3-Mercaptopropionate)

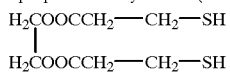

(l) Polyethylene Glycol Dimercaptoacetates

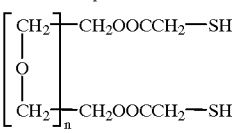

(m) Polyethylene Glycol Di(3-Mercaptopropionates)

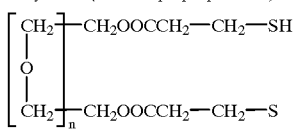

(n) 2,5-bis(mercaptomethyl)-1,4-dithiane (o) 3,6-dithia-1,8-octanedithiol

The thiol compound may preferably be present in amounts of from approximately 5 to 30% by weight, more preferably approximately 10 to 20% by weight, based on the total weight of the casting composition.

The cross-linkable polymeric casting composition may further include a strain reducing agent. The inclusion of a strain-reducing agent provides a reduction in strain evident in optical articles produced therefrom, together with a significant decrease in cure time, e.g. from approximately 6 hours to approximately 1 hour.

The strain reducing agent may be an epoxidised monomer or oligomer. The strain reducing agent should exhibit optical transparency, in use.

The epoxidised monomer may function as a diluent for the bisphenol monomer which may exhibit very poor solubility. The epoxidised monomer or oligomer may fall into one or more of the following classes: internal, terminal, mono-functional, di-functional, tri-functional, tetra-functional, aliphatic, aromatic, cyclic, structurally simple, structurally complex, esters, ethers, amines. An epoxidised soybean material may be used. The epoxidised monomer or oligomer may be selected from one or more of the following 1) Epoxidised soybean oil-Triglycerides of a mixture of epoxidised
   a) oleic acid, b) linoleic acid, c) linolinic acid a)

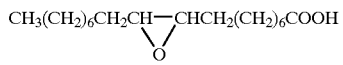

b)

c)

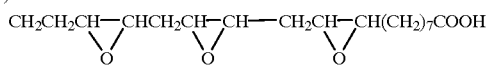

2) Propylene Oxide

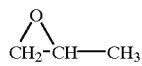

3) Hexanediol diglycidyl ether (HDGE)

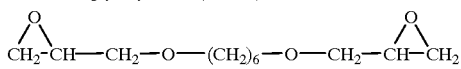

4) 1,2 epoxy butane

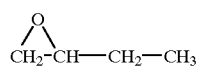

5) Bisphenol fluorene diglycidyl ether (BPGE)

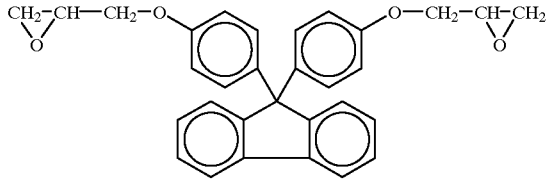

6) Epolight 100MF

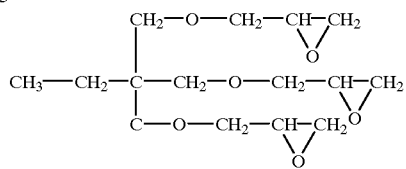

7) AK-601

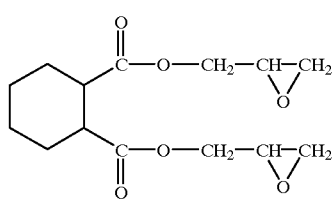

8) MY 721

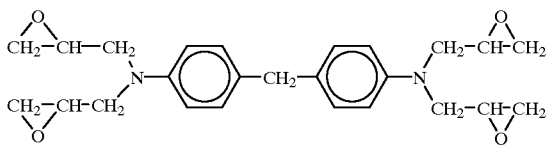

The epoxidised monomer may be present in a sufficient amount to render the bisphenol monomer soluble or dispersible in the monomer mix. The secondary epoxidised monomer may be present in amounts of from approximately 0.001% to 2.5% by weight, preferably 0.01% to 1%, more preferably approximately 0.05% to 0.4%, based on the total weight of the casting composition.

The crosslinkable polymeric casting composition according to the present invention may be utilised in the preparation of an optical article. The optical article may be characterised by having an increased hardness relative to known prior art articles. The optical article may exhibit a high to very high refractive index, excellent colour and low density. Surprisingly, the cross-linkable polymeric casting composition may exhibit a reduced cure time of for example from approximately 6 hours to approximately 1 hour.

By the term "high refractive index", as used herein, we mean a polymer having a refractive index of at least approximately 1.55, preferably 1.57. By the term "very high refractive index" as used herein, we mean a polymer having a refractive index of approximately 1.59 or above, preferably 1.60 or above.

By "low density", as used herein, we mean a density in the range of approximately 1.15 to 1.25 g cm$^{-3}$.

The cross-linkable polymeric casting composition may optionally further include a polymerisable comonomer.

The polymerisable comonomer may be selected to improve the properties and/or processability of the cross-linkable polymeric casting composition. The polymerisable comonomer may be an unsaturated comonomer. The polymerisable comonomer may be selected from any suitable type, e.g. methacrylates, acrylates, vinyls, vinyl ethers, allyls, epoxides, and the like.

The polymerisable comonomer may preferably be selected from one or more of vinyls, allylics, polyoxyalkylene glycol di-, tri-, tetra- and high acrylates or methacrylates, polymerisable bisphenol monomers capable of forming a homopolymer having a high refractive index of more than 1.55, urethane monomers having 2 to 6 terminal acrylic or methacrylic groups, fluorene diacrylates or dimethacrylates, and thiodiacrylate or dimethacrylate monomers.

Where a vinyl comonomer is included, the vinyl comonomer may be selected from styrene, substituted styrenes, 3,9-divinyl-2,4,8,10-tetraoxaspiro[5,5]undecane (DTU), and mixtures thereof. The vinyl comonomers may be present in amounts of from approximately 1 to 40% by weight, preferably approximately 5 to 30% by weight, based on the total weight of the casting composition.

Where a thiodiacrylate or dimethacrylate is included, the thiodiacrylates or dimethacrylates may be selected from bis(4-methacryloylthioethyl)sulfide (BMTES) and bis(4-methacryloylthiophenyl)sulfide (BMTS). The thiodiacrylate or dimethacrylate may be present in amounts of from approximately 1 to 40% by weight, preferably approximately 5 to 20% by weight, based on the total weight of the casting composition.

Where a fluorene diacrylate or methacrylate is included, the fluorene diacrylate or dimethacrylate monomer may be selected from a bisphenol fluorene dihydroxy acrylate (BFHA) or a bisphenol fluorene dimethacrylate (BFMA) or mixtures thereof.

The fluorene diacrylate or dimethacrylate monomer may be present in amounts of from approximately 1 to 35% by weight, preferably approximately 1 to 20% by weight.

The polyoxy alkylene glycol diacrylate or dimethacrylate compound according to the present invention, when present, may include ethylene oxide or propylene oxide repeating units in its backbone. A polyethylene glycol dimethacrylate is preferred. Suitable materials include dimethacrylates where the number of repeating ethylene oxide groups is between 4 and 14.

The polyoxy alkylene glycol diacrylate or dimethacrylate component may be present in amounts of from approximately 1% by weight to 40% by weight, preferably approximately 5% to 20% by weight, based on the total weight of the casting composition.

The high index bisphenol monomer component in the cross-linkable casting composition when present may be selected from dimethacrylate and diacrylate esters of bisphenol A; dimethacrylate and diacrylate esters of 4,4'bishydroxy-ethoxy-bisphenol A and the like.

Preferred high index bisphenol compounds include bisphenol A ethoxylated dimethacrylate and tetra brominated bisphenol A ethoxylated dimethacrylates.

The high index bisphenol monomer may be present in amounts of from approximately 1 to 40% by weight, preferably 5 to 25% by weight based on the total weight of the casting composition.

In a further aspect of the present invention the cross-linkable polymeric casting composition may further include at least one unsaturated cross-linking monomer having 3 or more polymerizable groups per molecule (polyfunctional).

The poly functional unsaturated cross-linking monomer according to the present invention may be a tri- or tetrafunctional vinyl, an acrylic or methacrylic monomer. The cross-linking monomer may be a short chain monomer for example trimethylol propane trimethyacrylate, pentaerythritol triacrylate or tetracrylate, or the like.

An ethoxylated trimethylol propane triacrylate has also been found to be suitable.

The poly functional unsaturated cross-linking monomer may be present in amounts of from 0 to approximately 40% by weight, preferably approximately 5 to 20% by weight based on the total weight of the casting composition.

The cross-linkable casting composition according to the present invention may include a polymerisation initiator. The polymerisation initiator may be a ultraviolet (U.V.) cationic or radical initiator. A long wavelength UV initiator is preferred.

A range of long wavelength photoinitiators available commercially can be used, depending on sample thickness, type of U.V. lamp used and the absorption wavelength of the monomer mix.

The UV photoinitiator may be selected from the following:

TPO Lucirin LR 8728 2,4,6-trimethylbenzoyldiphenylphosphine oxide

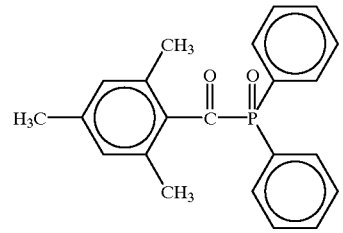

Irgacure 907 (2-methyl-1-[4-(methylthio)phenyl]-2-morpholinopropane 1-one)

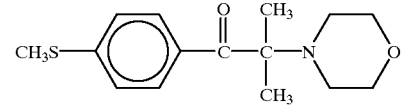

Irgacure 184 (hydroxycyclohexyl) phenyl ketone

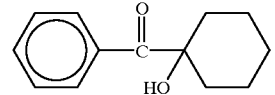

Iracure 369 (2-benzyl-2-N-dimethylamino-1-(4-morpholinophenlyl)-1-butanone)

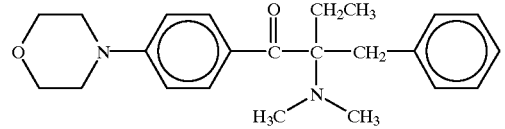

Lucirin BDK; Iracure 651 (Benzyl Dimethyl Ketal)

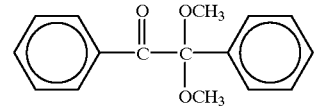

Vicure 30 2-(carbomoylazo)-substituted

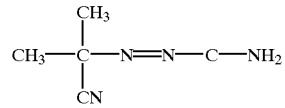

-continued

WB 4744 2-n-propoxy-9H-thioxanthen-9-one

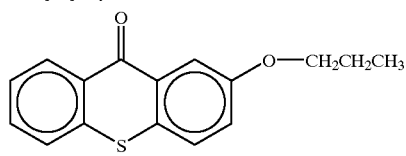

Quantacure EPD Ethyl 4-(dimethylamino)benzoate

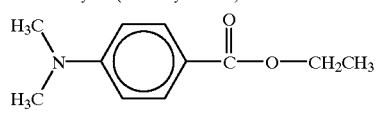

A mixture of two or more of the above may also be used.

The UV photoinitiator may be present in any suitable amounts in the cross-linking casting composition. The UV photoinitiator may be present in amounts of from approximately 0.05% to 0.25% by weight, preferably approximately 0.20% to 0.25% by weight, based on the total weight of the casting composition.

The source of ultraviolet radiation may be of any suitable type. Any commercial UV curing system may be used. We have used a Fusion System with microwave driven lamps. A number of fusion bulbs with different output Spectra may be considered.

One source we have found satisfactory is a 10 inch, 300 watt/inch mercury lamp. This means that fully cured lenses can be manufactured, if desired, in about 5 to 10 minutes.

Typically 2–4 passes under the U.V. completes the cure.

Other additives may be present which are conventionally used in casting composition such as inhibitors, dyes, UV stabilisers and materials capable of modifying refractive index. Mould release agents can be added but they are in general not required with the compositions used in the method of the present invention. Such additives may include:

UV Absorbers including

Ciba Geigy Tinuvin P-2(2'-hydroxy-5'methyl phenyl)benzotriazole

Cyanamid Cyasorb UV 531-2-hydroxy-4-n-octoxybenzophenone

Cyanamid Cyasorb UV5411-2(2-hydroxy-5-t-octylphenyl)-benzotriazole

Cyanamid UV 2098-2 hydroxy-4-(2-acryloyoxyethoxy)-benzophenone

National Starch and Chemicals Permasorb MA-2 hydroxy-45-(2 hydroxy-3-methacryloxy)propoxy benzophenone Cyanamid UV24-2,2'-dihydroxy-4-methoxybenzophenone BASF UVINUL 400-2,4 dihydroxy-benzophenone BASF UVINUL D-49-2,2'-dihydroxy-4,4'dimethoxy-benzophenone BASF UVINUL D-50-2,2',4,4'tetrahydroxy benzophenone BASF UVINUL D-35-ethyl-2-cyano-3,3-diphenyl acrylate BASF UVINUL N-539-2-ethexyl-2-cyano-3,3-diphenyl acrylate Ciba Geigy Tinuvin 213

Hindered amine light stabilisers (HALS), including

Ciba Geigy Tinuvin 765/292-bis(1,2,2,6,6-penta-methyl-4-piperidyl)-sebacate

Ciba Geigy 770-bis(2,2,6,-tetramethyl-4piperdinyl) sebacate

Antioxidants including

Ciba Geigy Irganox 245-triethylene glycol-bis-3-(3-tertbutyl-4-hydroxy-5-methyl phenyl)propionate Irganox 1010-2,2-bis[[3-[3,4-bis(1,1-dimethylethyl)-4-hydroxyphenyl]-1-oxopropoxy]methyl]-1,3-propanediyl 3,5-bis(1,1-dimethyl ethyl)-4-hydroxy benzene propanoate Irganox 1076-octadecyl 3-(3',5'-di-tert-butyl(-4'-hydroxyphenyl)propionate Anticolouring agents including 9,10 dihydro-9-oxa-10-phosphaphenanthrene-1-oxide Cure modifiers including Dodecyl mercaptan Butyl mercaptan Thiophenol Nitroso compounds such as Q1301 from Wako Nofmer from Nippon Oils and Fats Other monomeric additives can be present in amounts up to 10% by weight as viscosity modifiers, and include monomers such as methacrylic acid, vinyl silanes and other functional monomers. Other monomeric additives may be included to improve processing and/or material properties, these include:

methacrylic acid, maleic anhyride, acrylic acid adhesion promoters/modifiers such as Sartomer 9008, Sartomer 9013, Sartomer 9015 etc.

dye-enhancing, pH-adjusting monomers like Alcolac SIPOMER 2MIM a charge-reducing cationic monomer to render the material more antistatic example Sipomer Q5-80 or Q9-75

In a further aspect of the present invention there is provided a polymeric article formed from a cross linkable casting composition including an effective amount of a divinyl ester monomer a bisphenol compound, and a di- or polythio compound The polymeric article may be an optical article. The optical article may provide characteristics equal to or greater than those achievable with articles made from diethylene glycol bis(allyl carbonate) but with a considerably reduced cure time and substantially increased throughout. The optical article may be further characterised by having reduced weight and/or thickness relative to the prior art, high tg, very low Yellowness Index and low density, whilst retaining good abrasion resistance and impact resistance.

The overall refractive index may be in the high to very high refractive index range of approximately 1.58 to 1.70, preferably 1.59 to 1.65.

The optical articles prepared by the method of this invention include camera lenses, ophthalmic lenses and video discs.

The casting composition may be formed into a suitable article by mixing in a convenient vessel the components making up the material, and then adding the curing catalyst and/or photo-initiator. The mixed material is then degassed or filtered. As the curing time is substantially reduced the casing process may be undertaken on a continuous or semi-continuous basis.

Figure 1:
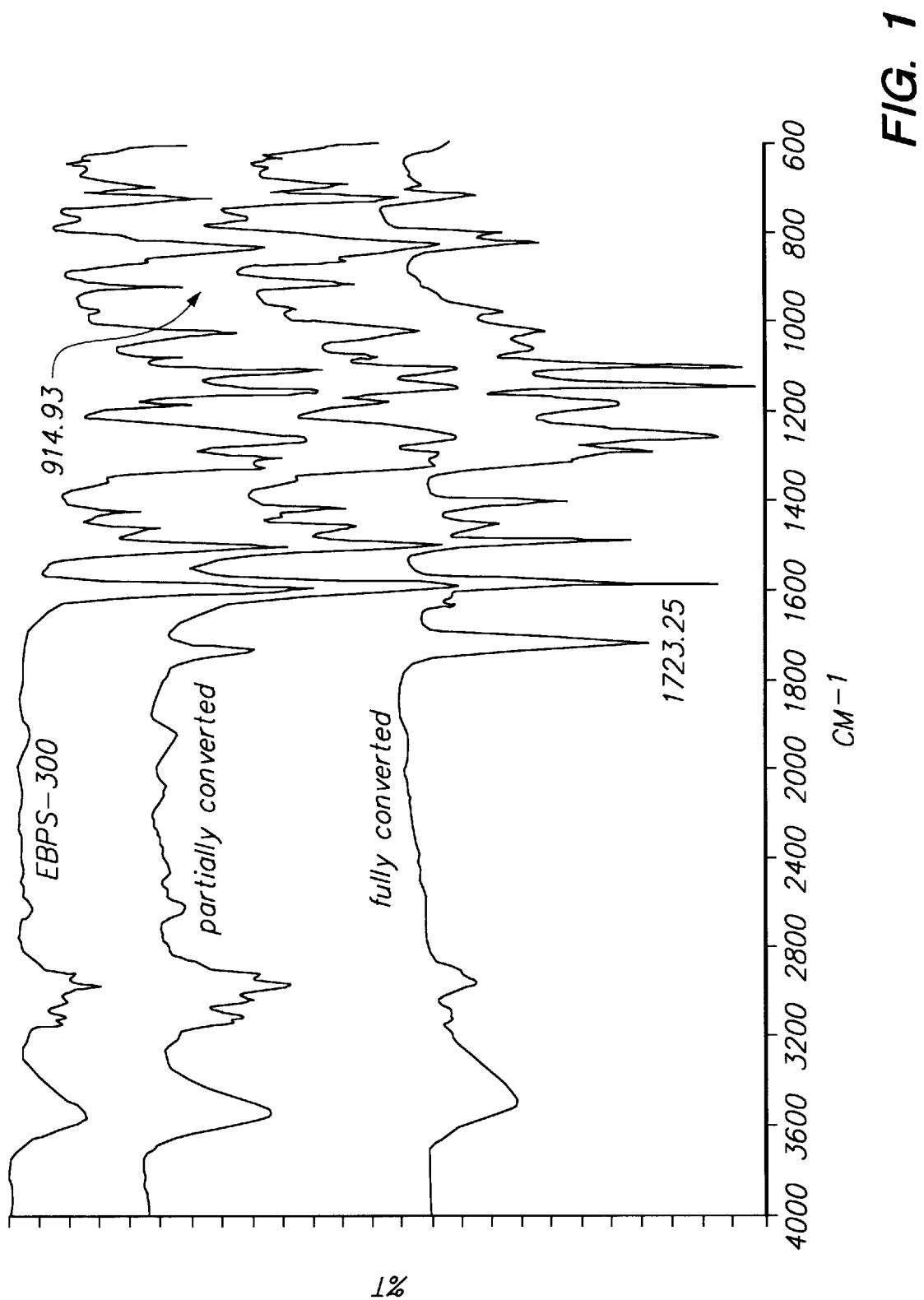
FIG. 1 is a FTIR spectra of (i) EBPS-3000, (ii) partially converted product, and (iii) fully converted product.

The present invention will now be more fully described with reference to the accompanying examples. It should be understood, however, that the description following is illustrative only and should not be taken in any way as a restriction on the generality of the invention described above.

EXAMPLE 1

Background

The diglycidyl ether of bisphenol-S EBPS-300 with a structure (I) was supplied by Japan Chemical Company. The converted product may then be used in the formulation of the cross-linkable polymeric casting composition according to the present invention to improve the hardness and impact strength.

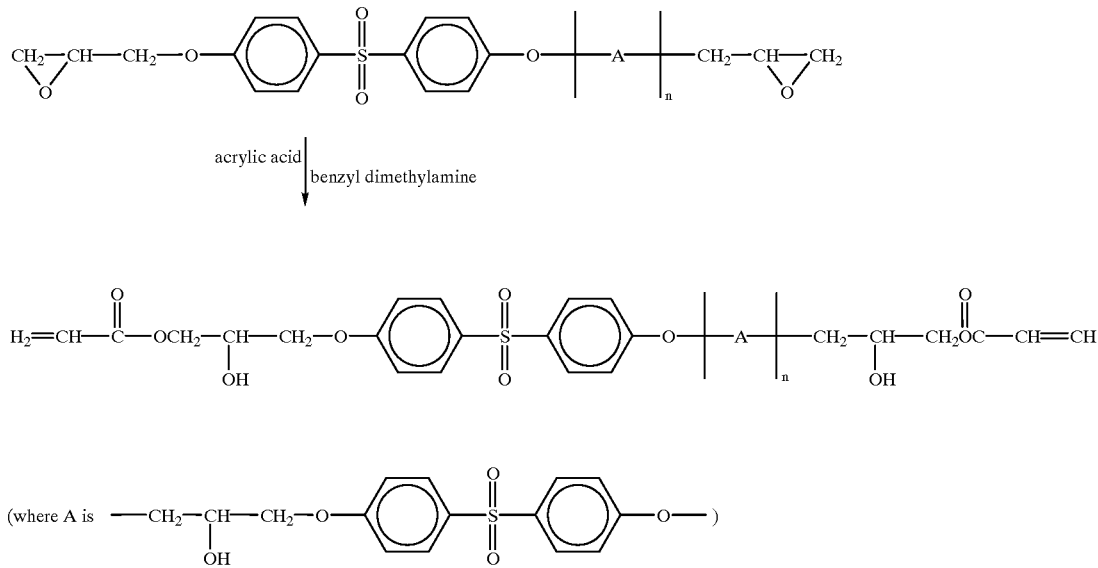

Materials

EBPS-300 (Japan Chemical Company, EEW=255), acrylic acid (Fluka, 99%), benzyl dimethyl amine (Pacific Anchor Chemical Corporation, Amicure BPMA).

Experimental

In a 500 ml round flask, 144 g acrylic acid (2 mol) and 2.7 g of benzyl dimethyl amine (0.02 mole) were stirred at 50° C., 51 g (0.2 mole) EBPS-300 solid was added by small portions during 2 hours. After another nine hours of stirring at 50° C., the FTIR showed that the epoxy group as fully converted into an acrylate. After cooling down, the product mixture was precipitated into 1 liter water. After drying, the product was dissolved in ethyl acetate (50 ml) first, then precipitated into 500 ml of petroleum ether (60 to 80° C.). The product was dissolved in acetone (50 ml) and precipitated into 1 liter of 0.1 M NaOH, 1 liter of 0.1 M HCl and 1 liter of distilled water successively. The final product was dried under vacuum at room temperature of two days. The yield of the product (II) was 54 g (83%). The product was a clear plastic like solid (slightly yellow). It could be molten at 60° C. The FTIR spectrum of the product showed the conversion of the epoxy groups into acrylate was complete (FIG. 1).

Discussion

The 915 cm$^{-1}$ peak in the infrared spectrum in FIG. 1 was associated with the oxirane group, it is the characteristic peak of epoxy resins. During conversion the peak at 915 cm$^{-1}$ gradually decreased till the whole peak disappeared. At the same time a band at 1723, which is due to the carbonyl group of the ester formation gradually increased (FIG. 1).

Conclusions 50 grams of the acrylated diglycidyl ether of bisphenol-S was obtained for formulation investigation. The monomer is miscible with a standard polymeric lens formulation and is UV curable. A lens was cast with 10% acrylated diglycidyl ether of bisphenol-S in a standard polymeric lens formulation. The hardness of this lens was 50% harder than a standard plastic lens.

EXAMPLE 2

The Conversion of Naphthalene-Based Epoxy Resin into an Acrylate Monomer

Background

The naphthalene-based epoxy resin (Epiclon HP-4032D) with a structure of (I) was supplied by Dainippon Ink Chemical Industry Company. The converted product may then be used in the UV curable formulation to improve the rigidity of the lens materials.

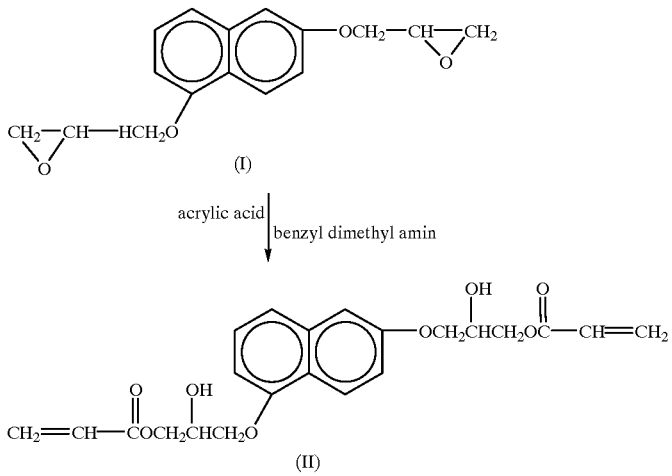

(I)

acrylic acid | benzyl dimethyl amin (II)

Materials

Epiclon HP-4032D (Dainippon Ink Chemical Industry Company, EEW-141, white solid), acrylic acid (Fluka, 99%), benzyl dimethyl amine (Pacific Anchor Chemical Corporation, Amicure BPMA). Acetone was dried over magnesium sulphate for two hours before use.

Experimental

In a 1 liter three neck round bottom flask equipped with a condenser and a magnetic stirrer, 110 g acrylic acid (1.52 mol, 100% excess), and 5.14 g of benzyl dimethyl amine (0.038 mole) were stirred at 50° C. 108 g Epiclon HP-4032D (0.76 mole epoxy groups) dissolved in 250 ml acetone was dropped in slowly during two hours through a pressure balanced dropping funnel. The reaction was carried out under nitrogen protection. After 18 hours of refluxing, the FTIR showed that the epoxy group was fully converted into acrylate. The product mixture was poured into 1 liter water. After 30 minutes standing, a viscous liquid was obtained at the bottom of the solution. The viscous liquid was further washed by water (3×1000 ml), 0.1 M NaOH aqueous solution (500 ml), water (1000 ml), 0.1 M HCl (2×500 ml) successively. The viscous liquid was dissolved into 500 ml ethyl acetate, and dried over anhydrous magnesium sulphate for 1 hour. The solvent was removed by rotary evaporator. The final product was dried under vacuum at room temperature for two days. The yield of the product (II) was 104 g (66%). The product was a viscous honey-like liquid (slightly yellow). The FTIR spectrum of the product showed the conversion of the epoxy groups into acrylate was complete (FIG. 1).

Properties of Monomer

| State | Appearance | Colour | RI | Abbe | Solubility |
|---|---|---|---|---|---|
| liquid | viscous | slightly yellow | 1.56 | 36 | good in most monomers |

Discussion

Figure 2:
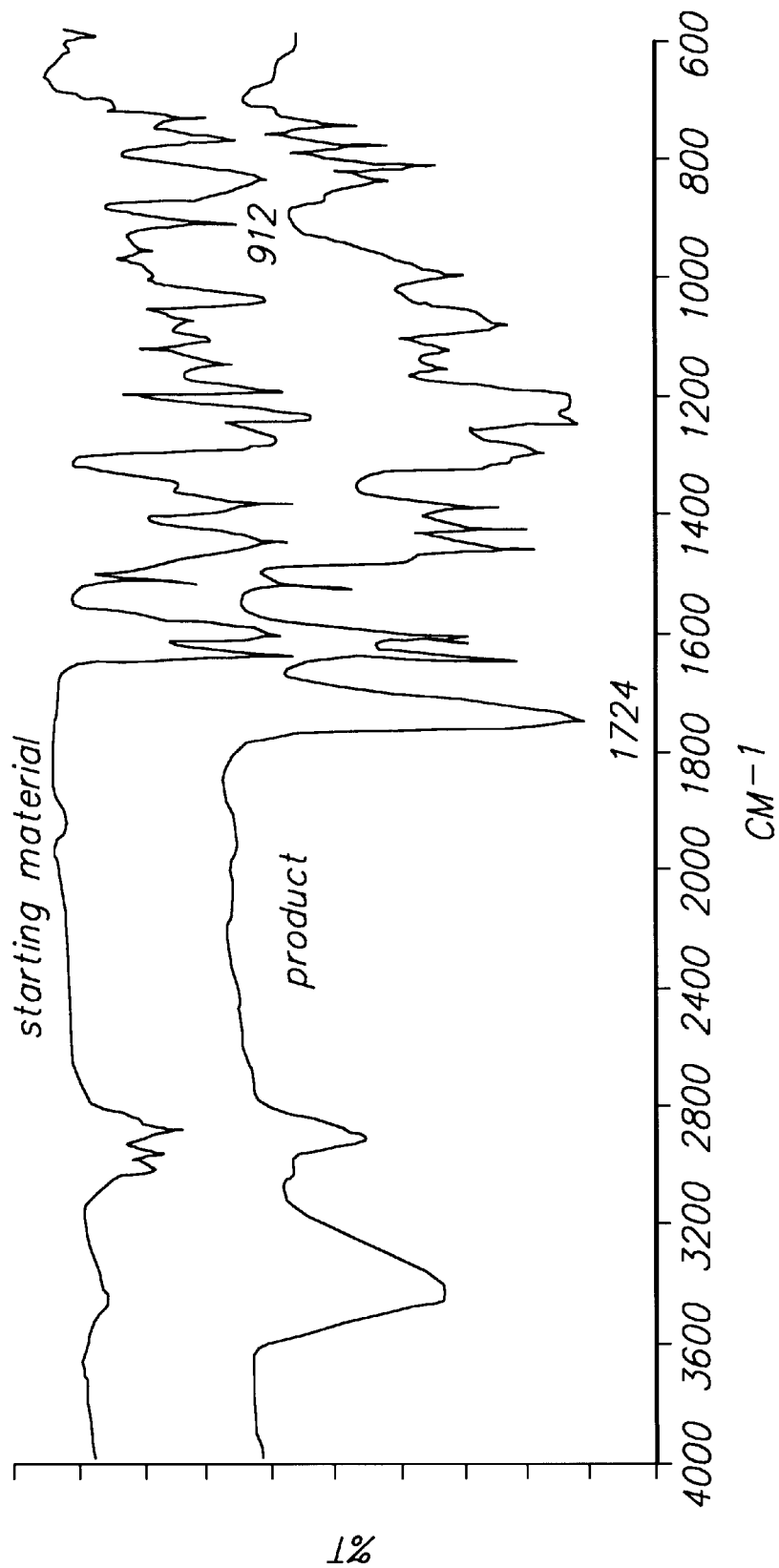
FIG. 2 is the infrared spectra of the starter material and product for the synthesis as described in Example 2.

The 912 cm−1 peak in the infrared spectrum (FIG. 2) was associated with the oxirane group, it is the characteristic peak of epoxy resins. After conversion the peak at 912 cm−1 disappeared completely. At the same time a band at 1724 cm−1, which is due to the carbonyl group of the ester formation was observed. The band at 3450 cm−1 is due to the hydroxy group in the product (FIG. 1).

Conclusions 100 grams of the acrylated naphthalene-based epoxy resin was obtained for formulation investigation. This monomer can be polymerised by both heat and UV curing method.

EXAMPLE 3

The Conversion of Biphenol Fluorene Diglycidyl Ether (BPGE) into Allylic Monomer The following reaction was carried out to convert bisphenol fluorene diglycidyl ether (BPGE) (III) into its allylic monomer, so that the converted allyl type monomer can be used in thiol-ene reactions.

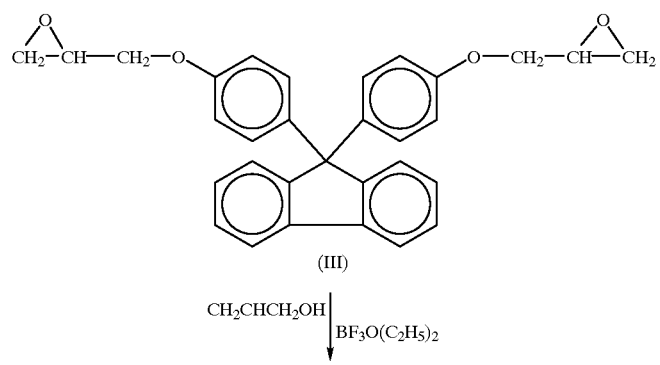

(III)

CH$_2$CHCH$_2$OH | BF$_3$O(C$_2$H$_5$)$_2$

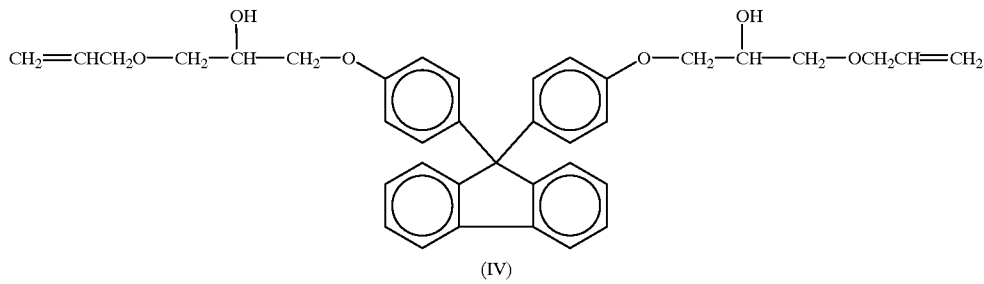

(IV)

Synthetic Method 276 g of bisphenol fluorene diglycidyl ether (0.6 mol) and 409 ml alcohol (6 mol, excess) was dissolved into 800 ml toluene (dried over anhydrous magnesium sulphate) at 70° C. The solution was then cooled down. Cooling with ice-bath, 6 ml boron trifluoride etherate was injected in by 1 ml portions, the temperature of the solution was controlled between 0 to 5° C. After 30 minutes stirring the ice bath was removed, the temperature was allowed to rise to room temperature (25° C.). Stirring at room temperature for two hours, the solution changed from cloudy to clear colourless. Both thin layer chromatography and infrared spectrum indicated the completion of the reaction at this stage. After further 5 hours stirring at room temperature, the solvent and excess allyl alcohol was removed by rotary evaporator under vacuum. Dissolved into 1 liter toluene, the solution was allowed to pass a silica gel column (10 cm in diameter, 5 cm in height). Removal of the solvent gate 240 g colourless, honey like liquid (IV). Yield=70%.

Properties of Monomer

| State | Appearance | Colour | RI | Abbe | Solubility |
|---|---|---|---|---|---|
| liquid | honey like | colourless | 1.60 | 26 | good in most monomers |

Discussion

Figure 3A:
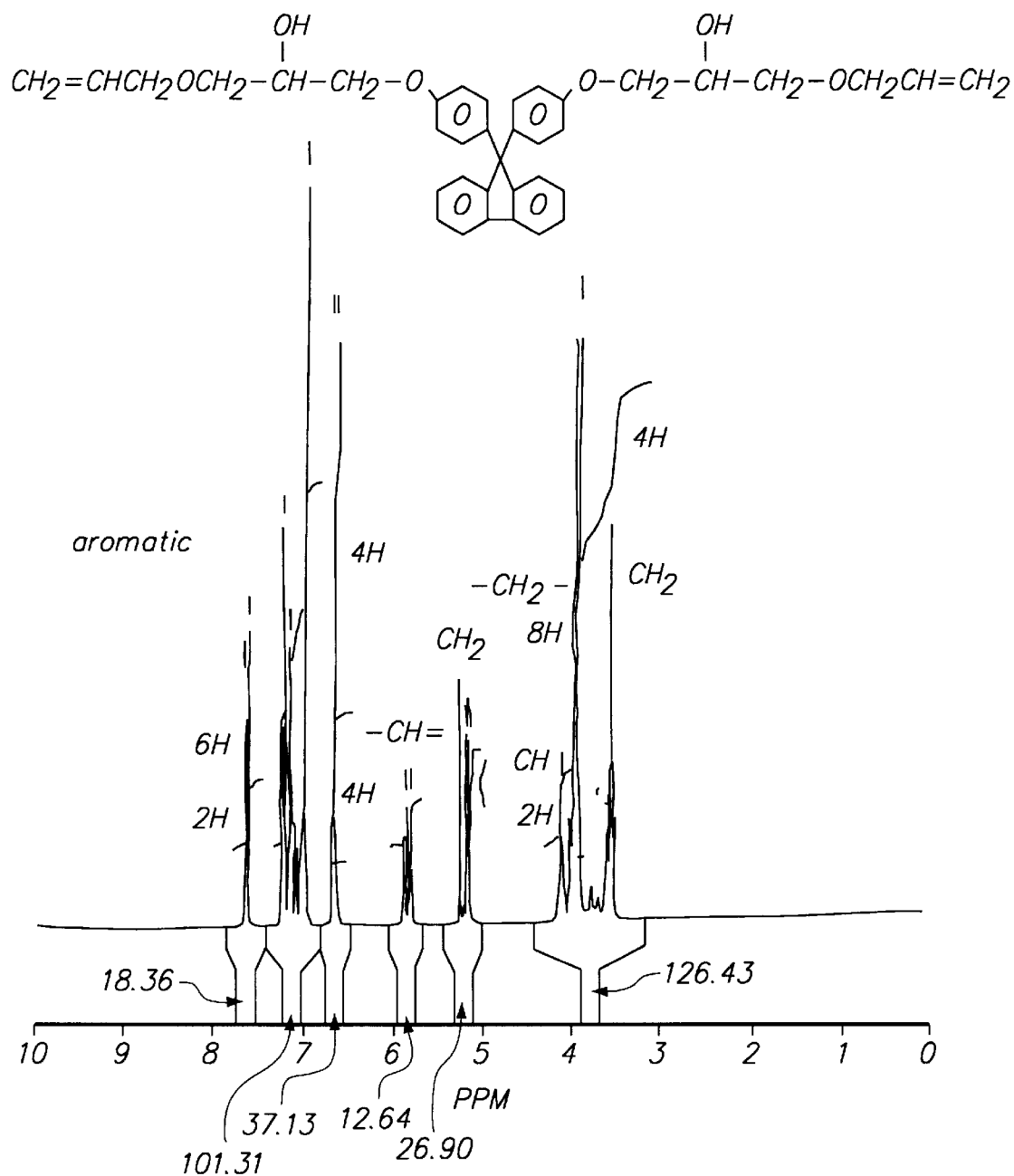
FIG. 3a is a $^1$H-NMR spectrum of the allyl monomer product of Example 3.
Figure 3B:
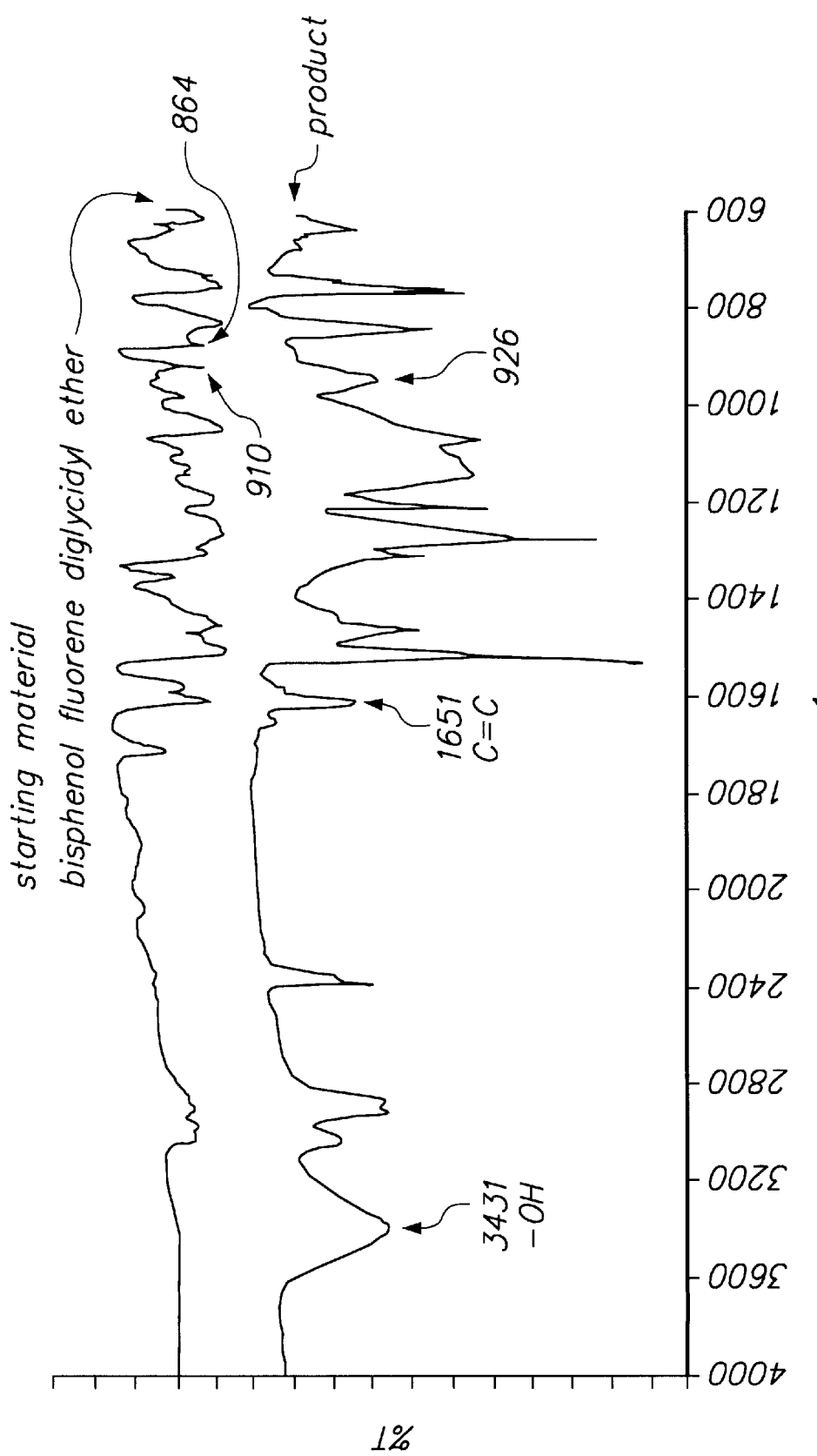
FIG. 3b is the infrared spectrum showing the dissappearance of the starting material in the conversion of bisphenol fluorene diglycidylether into an allyl monomer as described in Example 3.

Both the thin layer chromatography and infrared-spectrum (FIG. 3b) indicated the disappearance of starting material. In the IR spectrum, the peaks at 910 and 864 cm−1 which are associated with epoxide group disappeared, new peaks at 1651 (CH2=CH—), and 3431 (OH) cm−1 were observed. $^1$H-NMR spectrum (FIG. 3a) confirmed the formation of the allyl monomer.

This monomer can be cured by heat with 3% of TX29 as initiator MDO was UV curable. The stoichiometrical formulation of allylic bisphenol fluorene with the conversion of double bonds and thiol groups were complete.

Conclusions

This monomer is a colourless viscous liquid, it is possible to be used in lens formulation. Refractive index of this monomer is 1.60.

EXAMPLE 4

Synthesis of Diallyl Ether of 4,4'-Sulfonyldiphenol

Introduction

In order to obtain a rigid monomer the diallyl ether of 4,4'-sulfonyldiphenol was synthesised.

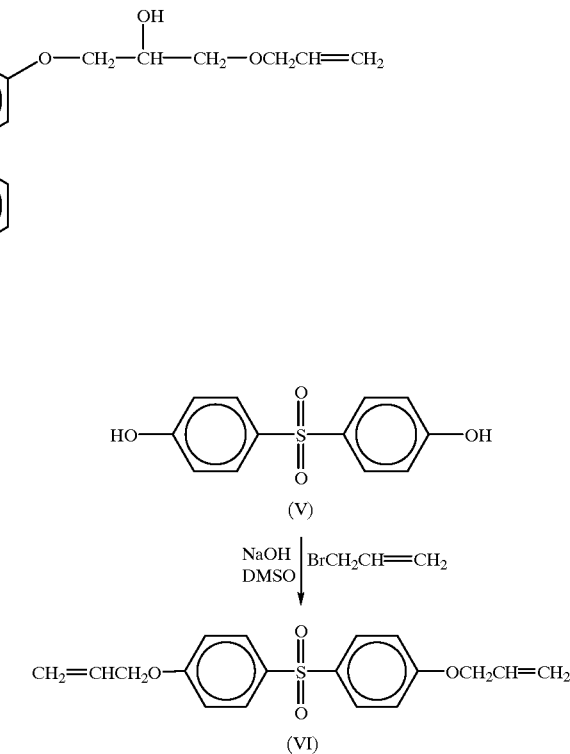

Synthetic Method 25 g 4,4'-sulfonyldiphenol sulfate (0.1 mol, V) was dissolved into 200 ml DMSO with 12 g NaOH (0.3 mol). The mixture was heated to 65 to 70° C. with stirring and $N_2$ protection, then 19 ml (0.22 mol, 10% excess) allyl bromide was added slowly during 1 hour. After 6 more hours reaction at 70° C. the reaction mixture was poured into 1 liter water. On standing overnight, a lot of solid was formed. The solid was collected by filtration, washed twice with water and recrystallised from acetone/water mixture solvent twice. After drying 27 g of white crystalline solid were obtained (VI)(yield=82%).

Properties of Monomer

| State | Appearance | Colour | RI | Melting Point | Solubility |
|---|---|---|---|---|---|
| solid | crystals | white | 1.61 (Expod) | 146.5–147.5° C. | low in most monomers |

Discussion

Figure 4A:
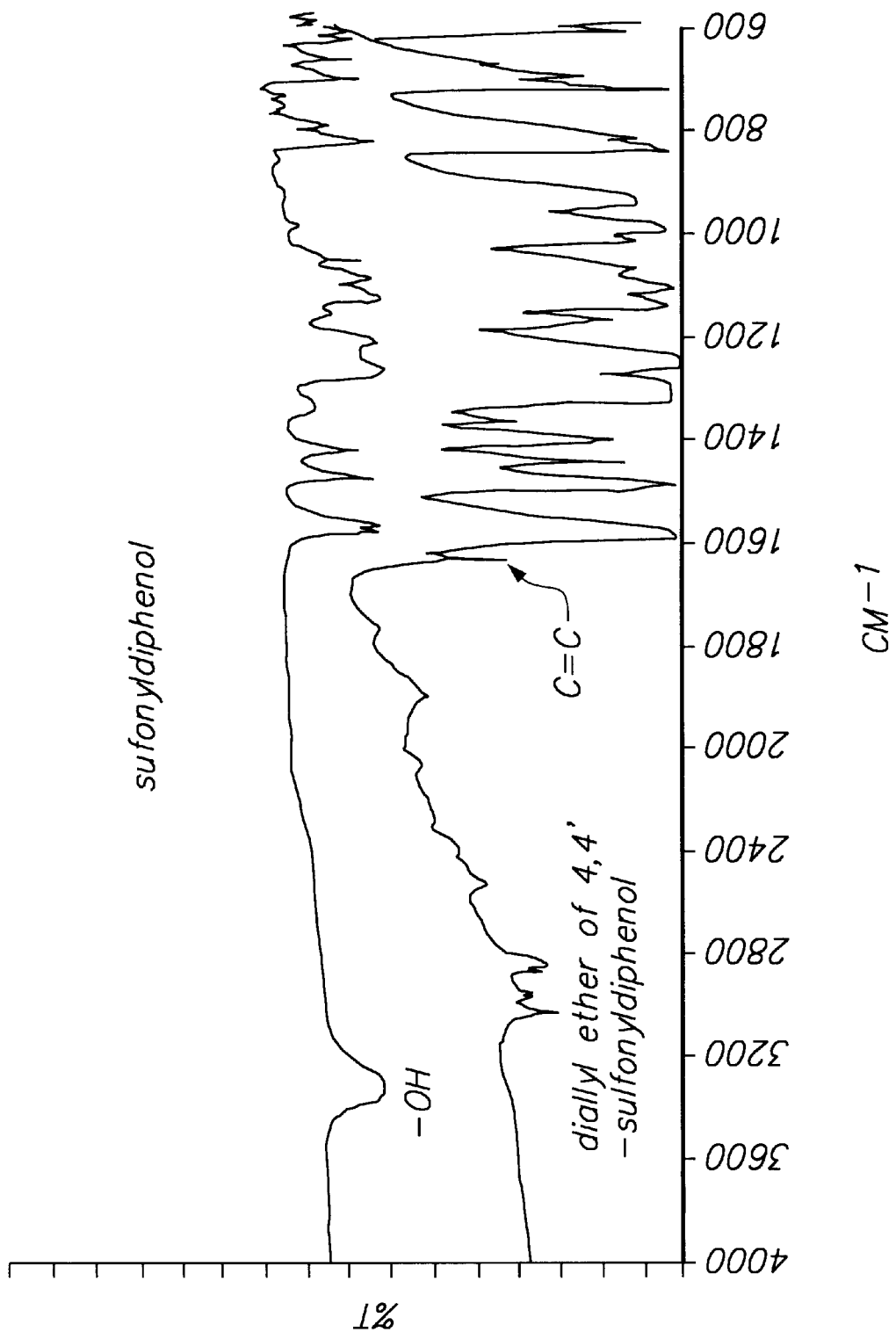
FIGS. 4a and 4b are infrared spectra and $^1$H-NMR spectra respectively of the diallyl ether of 4,4'-sulfonyldiphenol product for the synthesis described in Example 4.
Figure 4B:
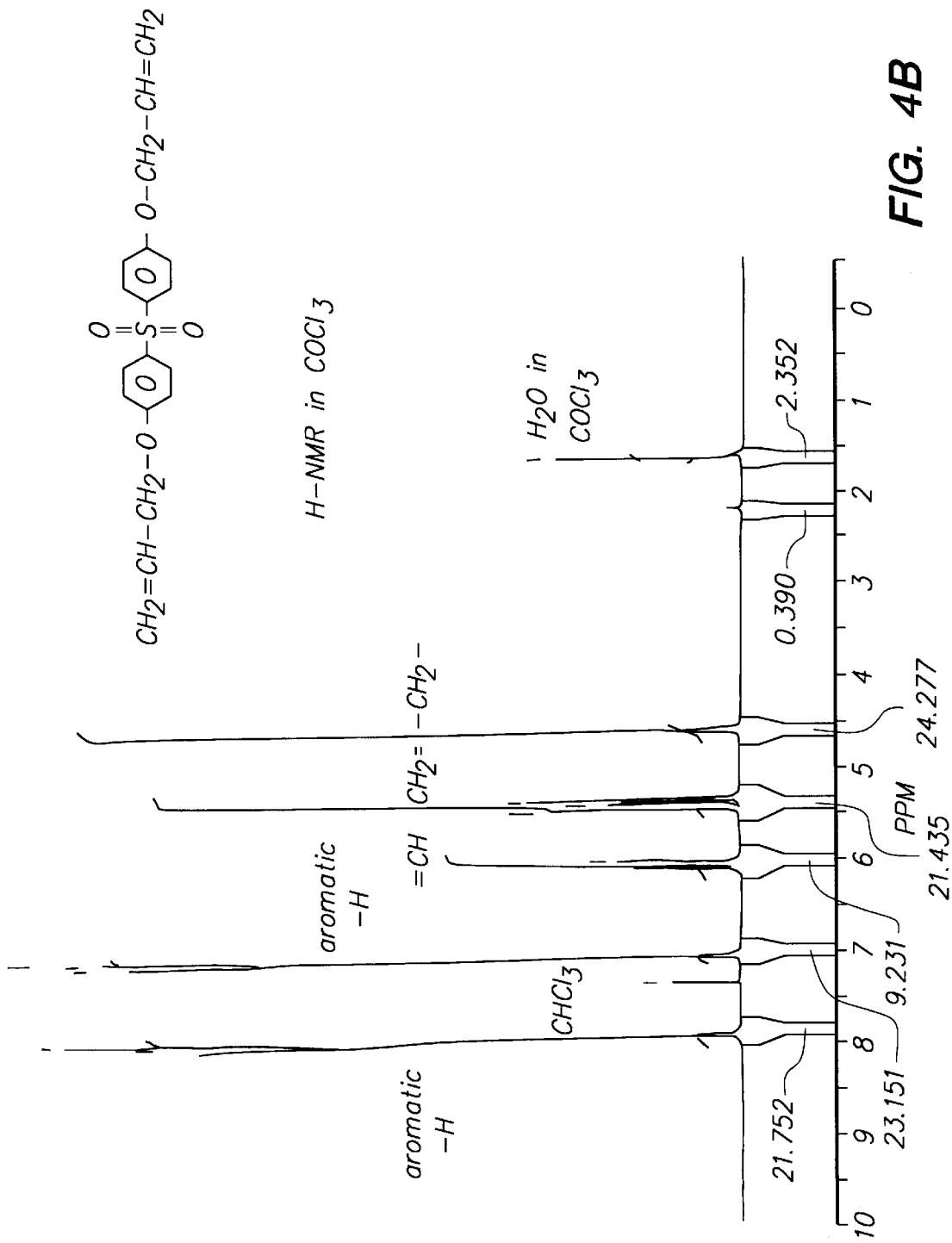

Both $^1$H-NMR (FIG. 4b) and infrared spectra (FIG. 4a) confirmed the chemical structure of the product.

Conclusion

This crystalline solid is white in solid state, it is possible to be used in lens material formulation in term of colour. Refractive index of this compound is 1.61 as predicted by Expode computer software. Formulations with polythiols can be cured by UV irradiation.

EXAMPLE 5

A cross-linkable casting composition having the following components was prepared

| | Percent |
|---|---|
| PTMP (pentaerythritol tetrakis (3-mercapto-propionate) | 27 |
| Bisphenol S ethoxylated divinyl ester (Example 1) | 70 |
| Epolight 100 MF | 0.4 |
| Nofmer-MSD (2,4-diphenyl-4-methyl-1-pentene) | 2.6 |

The monomer mix was prepared in a beaker together with 0.2% TPO Lucirin long wavelength U.V. initiator.

The casting material was used to fill the space between a pair of glass moulds separated by a plastic gasket at their periphery and held together by a clip. The mould was then passed 4 times under a U.V. lamp. Cure time was 1 hour.

Finally, it is to be understood that various other modifications and/or alternations may be made without departing from the spirit of the present invention as outlined herein.

What is claimed is:

1. A cross-linkable polymeric casting composition including an effective amount of a divinyl ester monomer selected from compounds having the formula

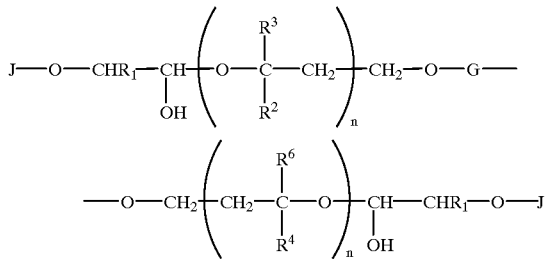

wherein

G is selected from the group consisting of

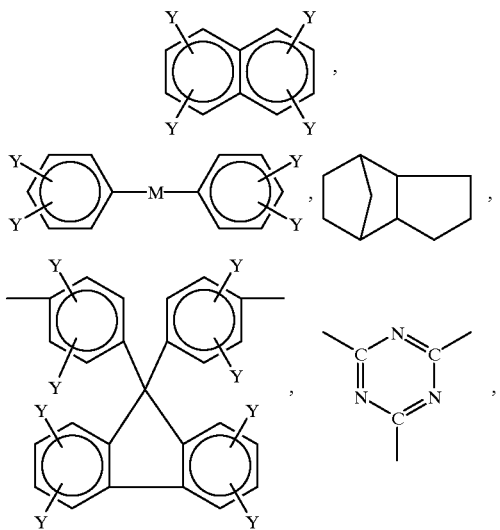

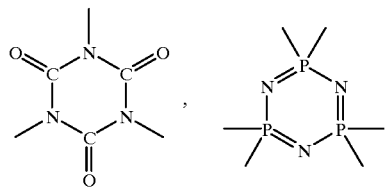

M is selected from the group consisting of a bond,

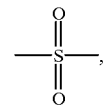

—S— methylene and —CH$_2$—S—CH$_2$—

$R_1$, $R_2$, $R_3$ and $R_4$ which may be the same or different, are selected from the group consisting of hydrogen and alkyl of 1 to 6 carbon atoms, n is an integer having a value of 0 to 10, Y is hydrogen or a halogen; and J is an unsaturated terminal group selected from allyl and the group of formula

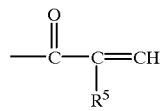

where $R^5$ is hydrogen or $C_1$ to $C_6$ alkyl, and optionally a minor amount of a di- or polythio compound.

2. A cross-linkable polymeric casting composition according to claim 1 wherein in said compounds of formula I the group G is naphthalene or provides a bisphenol S or bisphenol fluorene derivative and Y is selected from the group consisting of hydrogen, fluorine, chlorine and bromine.

3. A cross-linkable polymeric casting composition according to claim 1 wherein the divinyl ester monomer comprises one or more monomers selected from the group consisting of an ethoxylated bisphenol S vinyl ester of the formula

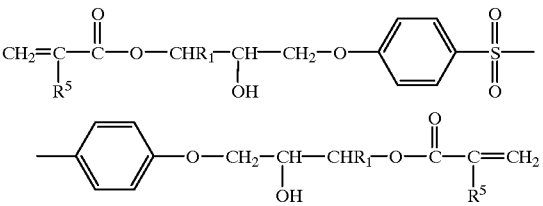

a naphthalene-based ethoxylated divinyl ester of the formula

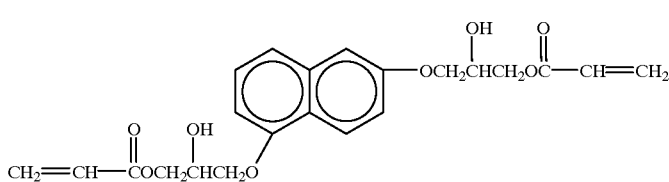

(II)

a bisphenol fluorene diglycidyl allylic monomer of the formula

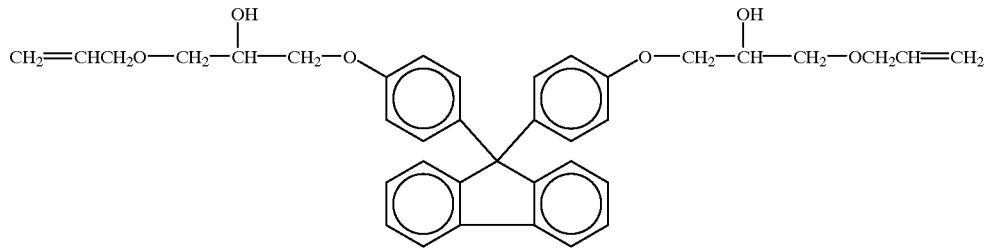

and
a bisphenol S diallyl ether of the formula

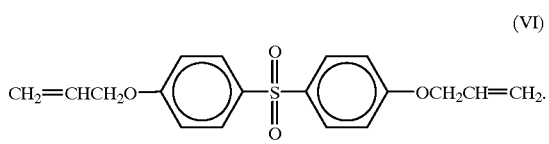

(VI)

4. A cross-linkable coating composition according to claim 1 wherein the divinyl ester monomer is present in amounts of from about 5 to about 80% by weight.

5. A cross-linkable casting composition according to claim 4 wherein the divinyl ester is present in an amount of about 10 to about 70% by weight.

6. A cross-linkable casting composition according to claim 1 wherein the di- or polythio compound is present and is selected from the group consisting of di-, tri- and tetra polythiol compounds.

7. A cross-linkable casting composition according to claim 6 wherein the di- or polythio compound comprises one or more compounds selected from the group consisting of: Pentaerythritol Tetrakis (3-mercapto-propionate) [PTMP], Trimethylolpropane Tris (3-mercaptopropionate) [TTMP], 4-mercaptomethyl-3,6-dithia-1,8-octanedithiol [MDO], Pentaerythritol Tetrakis (3-mercaptoacetate) [PTMA], Trimethylolpropane Tris (3-mercaptoacetate)[TTMA], 4-t-butyl-1,2-benzendithio, 2-mercaptoethylsulfide, 4,4'-thiodibenzenethiol, benzenedithiol, Glycol Dimercaptoacetate, Glycol Dimercaptopropionate Ethylene bid(3-Mercaptopropionate), Polyethylene Glycol Dimercaptoacetates, Polyethylene Glycol Di(3-Mercaptopropionates), 2,5-bis(mercaptomethyl)-1,4-dithiane and 3,6-dithia-1,8-octamedithiol.

8. A cross-linkable coating composition according to claim 1 wherein the thiol compound is present in amounts of from about 5 to about 30% by weight of the total casting composition.

9. A cross-linkable coating composition according to claim 3 further comprising strain reducing agent.

10. A cross-linkable coating composition according to claim 9 wherein the strain reducing agent is present in an amount sufficient to decrease the cure time.

11. A cross-linkable coating composition according to claim 9 wherein the strain reducing agent comprises one or more compounds selected from the group consisting of: Epoxidised soybean oil, Propylene Oxide, hexanediol diglycidyl ether (HDGE), 1,2 epoxy butane, Bisphenol fluorene diglycidyl ether (BPGE), Epolight 100MF, AG-601 and MY721.

12. A cross-linkable coating composition according to claim 9 wherein the secondary epoxidised monomer is present in amounts of from approximately 0.001% to 2.5% by weight based on the total weight of the casting composition.

13. A cross-linkable coating composition according to claim 1 further comprising one or more polymerisable comonomers selected from the group consisting of vinyls, allylics, poloxyalkylene glycol di-, tri-, tetra- and higher acrylates or methacrylates, polymerisable bisphenol monomers capable of forming a homopolymer having a high refractive index of more than 1.55, urethane monomers having 2 to 6 terminal acrylic or methacrylic groups, fluorene diacrylates or dimethacrylates, and thiodiacrylate or dimethacrylate monomers.

14. A cross-linkable coating composition according to claim 1 further comprising a polymerisation initiator selected from ultraviolet (U.V.) cationic or radical initiators.

15. A cross-linkable coating composition according to claim 14 wherein the initiator comprises one or more compounds selected from the group consisting of: 2,4,6-trimethylbenzoyldiphenylphosphine oxide, (2-methyl-1-[4-(methylthio) phenyl]-2-morpholinopropane-1-one), (hydroxycyclohexyl) phenyl ketone, (2-benzyl-2-N-dimethylamino-1-(4-morpholinophenyl)-1-butanone), (Benzyl Dimethyl Ketal), 2-(carbamoylazo)-substituted, 2-n-propoxy-9H-thiuoxanthen-9-one and Ethyl 4-(dimethylamino)benzoate.

16. An optical article prepared from the casting composition of claim 1.

17. An optical article according to claim 16 having a refractive index of at least approximately 1.55.

18. An optical article according to claim 16 having a refractive index of at least 1.57.

19. An optical article according to claim 16 having a density in the range of about 1.15 to 1.25 g cm-3.

* * * * *